Feb. 8, 1955 P. CALVI 2,701,503
PRODUCTION OF PARALLAX PANORAMAGRAMS
Filed Jan. 21, 1952 2 Sheets-Sheet 1
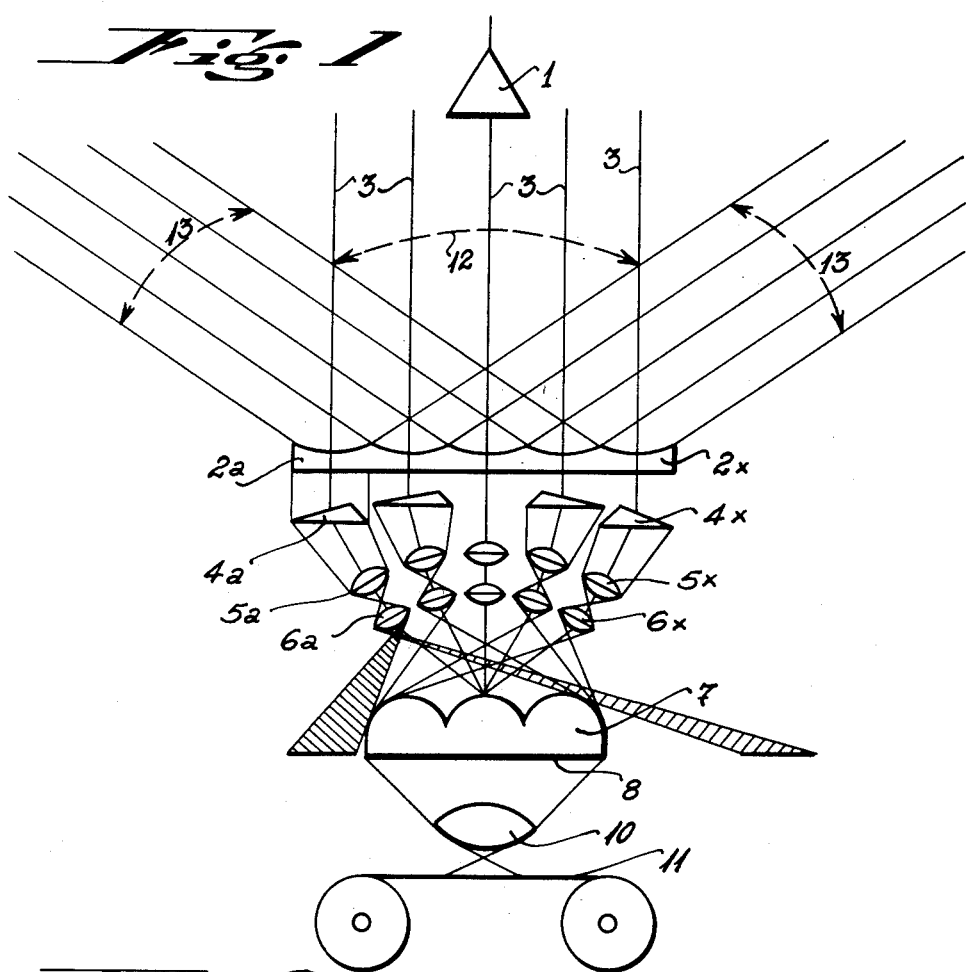
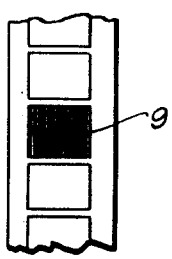
INVENTOR.
PERICLES CALVI

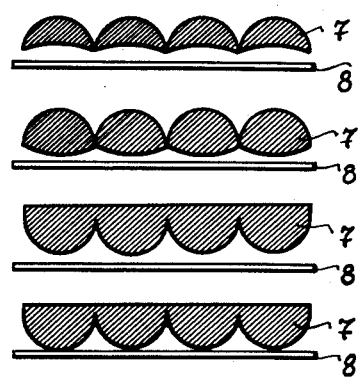
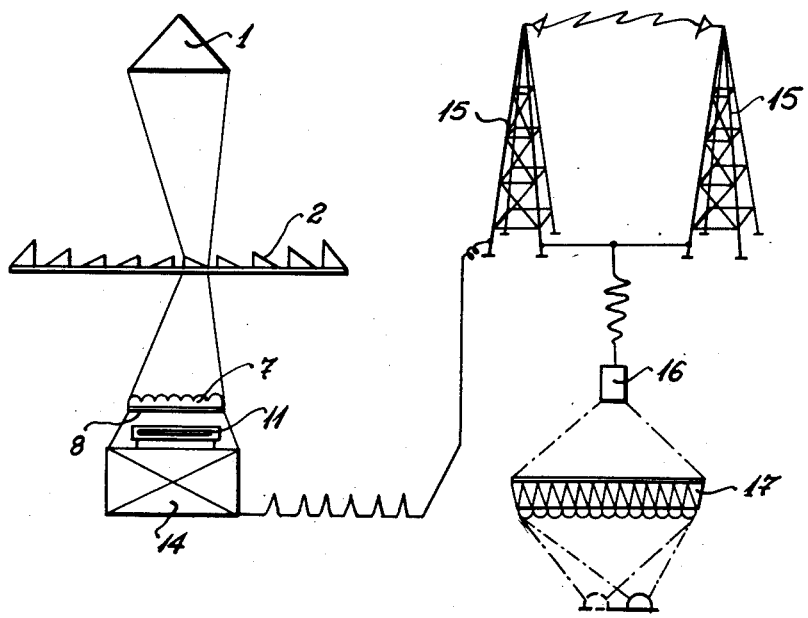

United States Patent Office 2,701,503
Patented Feb. 8, 1955

2,701,503

PRODUCTION OF PARALLAX PANORAMAGRAMS

Pericles Calvi, Buenos Aires, Argentina

Application January 21, 1952, Serial No. 267,362

2 Claims. (Cl. 88—16.6)

My present invention relates to the art of producing parallax panoramagrams and provides for certain new and useful improvements in the production of parallax panoramagrams or pictures exhibiting stereoscopic relief, when projected and viewed as described in my co-pending application Serial No. 114,401, now abandoned, of which this is a continuation-in-part application.

The main object of the invention is to provide an improved arrangement for producing parallax panoramagrams or stereoscopic relief pictures photographically, cinematographically or by television, which arrangement is particularly advantageous in as far as the component optical parts thereof are stationary and may be readily adapted to photographic or cinematographic cameras and to television apparatus.

The improved arrangement for producing parallax panoramagrams, according to my invention, is based upon the method of picking up a plurality of adjacent front views of a given scene or object and composing a complex image formed by the intercalation of vertically condensed image stripes which are printed on a photographic plate or film or picked up by the iconoscope of a television transmitter.

This method differs from the known systems by that each stereogram is composed of a plurality of image lines constituting parts of the views of a plurality of views which are simultaneously picked up from different points situated on one and the same plane in front of the scene or object so that only the centre of the middle view coincides with the centre of said scene or object, and also by that the views picked up by a multiple objective are projected superimposed on a lineater, with the result that when the superimposed views which have been picked up from different viewpoints situated on one and the same plane in front of the scene or object are projected on said lineater, a distinct refraction is produced of each view by the lenses of the lineater which in addition to a subdivision of each view into vertically condensed image stripes, effects an arrangement of the refracted image lines in groups of adjacent lines correlative to the views as picked up by the lenses of the multiple objective, without producing gaps between or overlapping of the refracted image lines.

Consequently, one important object of the invention consists in providing an improved process for producing parallax panoramagrams or stereoscopic relief pictures, characterized by that a plurality of views of a given scene or object are simultaneously picked up by a multiple objective the lenses of which are arranged on one and the same plane in front of and with regard to said scene or object, these views being projected in superimposed arrangement on a lineater and refracted by the latter in such a manner that the adjacent lenses of the lineater in addition to a subdivision of each view, effects an arrangement of the refracted image lines in groups of lines correlative to the views as picked up by the lenses of the multiple objective, and the so produced and arranged image lines from a flat translucent member of said lineater are impressed in a known manner on a photographic plate or film or directly picked up by the iconoscope of a television transmitter.

Another object of the invention is to provide an improved arrangement for producing parallax panoramagrams, which comprises a multiple objective having the different lenses which compose the same arranged on one and the same plane so that the focus of one lens is parallel to that of another lens, and being capable of simultaneously picking up from a given scene or object a plurality of views from adjacent viewpoints situated on one and the same plane in front of said scene or object; a plurality of prisms arranged behind said multiple objective in such a manner that for each lens of this objective there is one prism for refracting the views picked up by the multiple objective and projecting the same on a lenticular lineater; a pair of lenses interposed between this lineater and each of said prisms for concentrating and inverting the light rays of the view picked up by each lens of the multiple objective and projected on said lineater, this lineater being capable of subdividing said views into vertical image stripes, of condensing the latter into fine vertical image lines, of refracting these image lines so as to project the same on a flat translucent member forming part of the lineater, in such a manner that said image lines are reproduced on said translucent member in groups of lines correlative to the views as picked up by the lenses of said multiple objective; the so formed optical assembly being arranged in front of the usual objective of photographic or cinematographic camera or of the iconoscope of a television transmitter.

According to one feature of the invention, the optical assembly as referred to in the preceding paragraph, comprises a lenticular lineater constituted by a transparent body composed of a member of adjacent vertical lenses and combined with a flat translucent member arranged on or near the outer surface of said transparent body i. e. the surface of the lineater situated in front of the objective of the photographic or cinematographic camera or in front of the iconoscope of a television transmitter, the number of the lenses of the lenticular lineater being independent from the number of lenses of the said multiple objective, but as higher the number of lenses of the lineater the better will be the stereoscopic effect of the images when reproduced on a screen of larger size, but of the same construction of said lineater.

With these objects and advantageous features in view, the present invention comprises the arrangement, combination and construction of parts as will be hereinafter fully explained wtih particular reference to the accompanying drawing, whereon the invention has been illustrated schematically and by way of example only.

On the drawing:

Figure 1 is a plan diagrammatic view which shows the arrangement of the optical assembly for producing parallax panoramagrams according to the invention;

Figure 2 shows the image as produced by said arrangement on a single frame of a strip of photographic film;

Figure 3 shows several different embodiments of the lenticular lineater forming part of said arrangement; and Figure 4 is a schematic view showing the application of the invention to a television system.

Having reference to the accompanying drawings, the numeral 1 indicates an object or scene of which a parallax panoramagram or stereoscopic relief picture has to be produced. The optical arrangement for producing the stereogram, according to the present invention, comprises a multiple objective lens which is formed by an odd number of plano-concave cylindrical lenses $2_a$ to $2_x$ inclusive. The generating lines of the cylindrical lens surfaces of lenses $2_a$ to $2_x$ are vertical and the lenses are horizontally spaced and symmetrically arranged with respect to the central lens of the odd-numbered plurality of lenses. The rear surfaces of all of the several lenses are shown formed by a common vertical plane. The objective fields 3 of the several lenses are parallel to each other. Disposed behind each of the lenses except the central lens is a prism $4_a$ to $4_x$. Each of the prisms $4_a$ to $4_x$ bends the light rays received from the lens with which it is associated and directs them toward an optical system consisting of a pair of lenses $5_a$—$6_a$ to $5_x$—$6_x$. Each of the pairs of lenses $5_a$—$6_a$ to $5_x$—$6_x$ directs the light rays onto the rear surface of a reticular lineater 7 which consists of a series of convex cylindrical lenses. The pairs of lenses $5_a$—$6_a$ to $5_x$—$6_x$ are provided for the purpose of concentrating the several views picked up by each of the lenses $2_a$ to $2_x$, respectively, and for causing the same to be projected on the lineater 7 in their normal position i. e. without being inverted.

The lineater 7 comprises a transparent body formed by a member of adjacent vertical horizontally spaced cylindrical lenses 7a-x, the number of which, however, is independent of and unrelated to the number of the lenses 2a-x of the multiple objective, and a flat translucent image screen or layer 8. The structure of the lineater may be different as has been shown in Figure 3. It will be understood that the translucent screen member 8 arranged as shown in Figure 1 may be constituted by a translucent layer applied directly to the flat rear surface of the transparent lenticular body 7, and that in the embodiments as shown in Figure 3, such layer has to be applied to a transparent support or said member 8 may consist of a separate rigid translucent body.

The lineater operates in such a manner that the plurality of views projected thereon in superimposed position are subdivided by the vertical lenses 7a-x into image stripes the number of which corresponds to the number of said vertical lenses. The image stripes are vertically condensed by said lenses 7a-x into fine image lines and these lines are refracted and projected on the translucent member 8 in groups of immediately adjacent lines correlative to the views as picked up by the lenses 2a-x of the multiple objective. It will be readily understood that the higher the number of the lenses 7a-x the higher will be the number of groups of condensed image lines 9 (Figure 2) and the better will be the stereoscopic effect of the panoramagram which a usual objective 10 of a photographic or cinematographic camera will impress upon a plate or film 11 or which will be directly picked up by the iconoscope of a television transmitter. The film 11 is shown extending horizontally in Fig. 1 for purposes of diagrammatic illustration. Actually, the film 11 extends vertically, as shown in Fig. 2.

In the arrangement according to the invention and as clearly shown in Figure 1 the disposition of the optical systems comprising the lenses 5a-x and 6a-x is such that the same project on the lineater 7 only those parts 12 of the different views picked up by the lenses 2a-x of the multiple objective which are directly in front of said lenses 2a-x, and that the lateral parts 13 of said views which are not picked up by all of said lenses are entirely neglected. In this manner, when reproducing the stereograms on a projection screen, the stereoscopic relief picture on that portion of the screen which is situated directly in front of a spectator will not be incomplete.

Returning to the embodiments of the lineater as shown in Figure 3, it may be mentioned that the free space left between the lenticular body 7 and the translucent member 8 is advantageous in so far as it permits the passage of air and presents the surfaces of the lineater from getting dimmed with moisture under the influence of temperature changes.

Referring to Figure 4 of the accompanying drawings, the same illustrates the application of the invention to television systems. In Figure 4, 1 indicates again the object or scene the picture of which has to be transmitted by television, 2 is the multiple objective and 7 the lineater; the prisms 4 and lenses 5, 6 have been omitted in this schematic view for reasons of clearness. The reference numeral 11 indicates a cinematographic film in a cinematographic camera which is combined with a television transmitter 14; 15 are the antennas and 16 the television receiver which in this case is provided with a projection screen 17 of a construction like that of the screen formed by the lineater 7, 8. The operation of the invention as applied to a television system is exactly the same as that hereinbefore described in connection with a cinematographic system.

What I claim as new and desire to secure by Letters Patent is:

1. A device for the production of a plurality of vertically striated images of an object, said device comprising: a substantially plane translucent surface upon which said images are formed; a lenticular lineater comprising a plurality of vertical cylindrical lens surfaces disposed in front of said translucent surface; a multiple objective lens comprising an odd-numbered plurality of horizontally spaced vertical cylindrical lens surfaces arranged in a row symmetrically with respect to a central one of said lens surfaces; a prism disposed behind each of said lens surfaces except said central lens surface, each prism deflecting light from one of said lens surfaces toward the central axis of said multiple objective lens; a non-inverting optical system disposed behind each prism; and a further non-inverting optical system disposed behind said central lens surface, all of said optical systems concentrating and directing light rays toward said lenticular lineater, whereby an image will be produced on said translucent surface having a number of groups of striations determined by the number of lenses formed by said lens surfaces of said lineater and a number of striations within each group determined by the number of lenses formed by said lens surfaces of said multiple objective lens.

2. A device according to claim 1, wherein said lenticular lineater is disposed in spaced relationship with respect to said translucent surface.

References Cited in the file of this patent

UNITED STATES PATENTS

| | | |
|---|---|---|
| 1,851,705 | Herz | Mar. 29, 1932 |
| 2,018,592 | Arnulf | Oct. 22, 1935 |
| 2,021,162 | Walton | Nov. 19, 1935 |
| 2,139,855 | Genies | Dec. 13, 1938 |
| 2,258,164 | Genies | Oct. 7, 1941 |
| 2,509,545 | Walton | May 30, 1950 |

FOREIGN PATENTS

| | | |
|---|---|---|
| 618,880 | France | Mar. 22, 1927 |
| 31,761 | France | June 11, 1927 |
| | (1st addition to No. 618,880) | |
| 829,035 | France | June 8, 1938 |
| 122,804 | Australia | Nov. 28, 1946 |